Sept. 22, 1942.     H. B. TOBIAS     2,296,585
DIRECTION SIGNALING DEVICE
Filed March 21, 1939     3 Sheets-Sheet 2
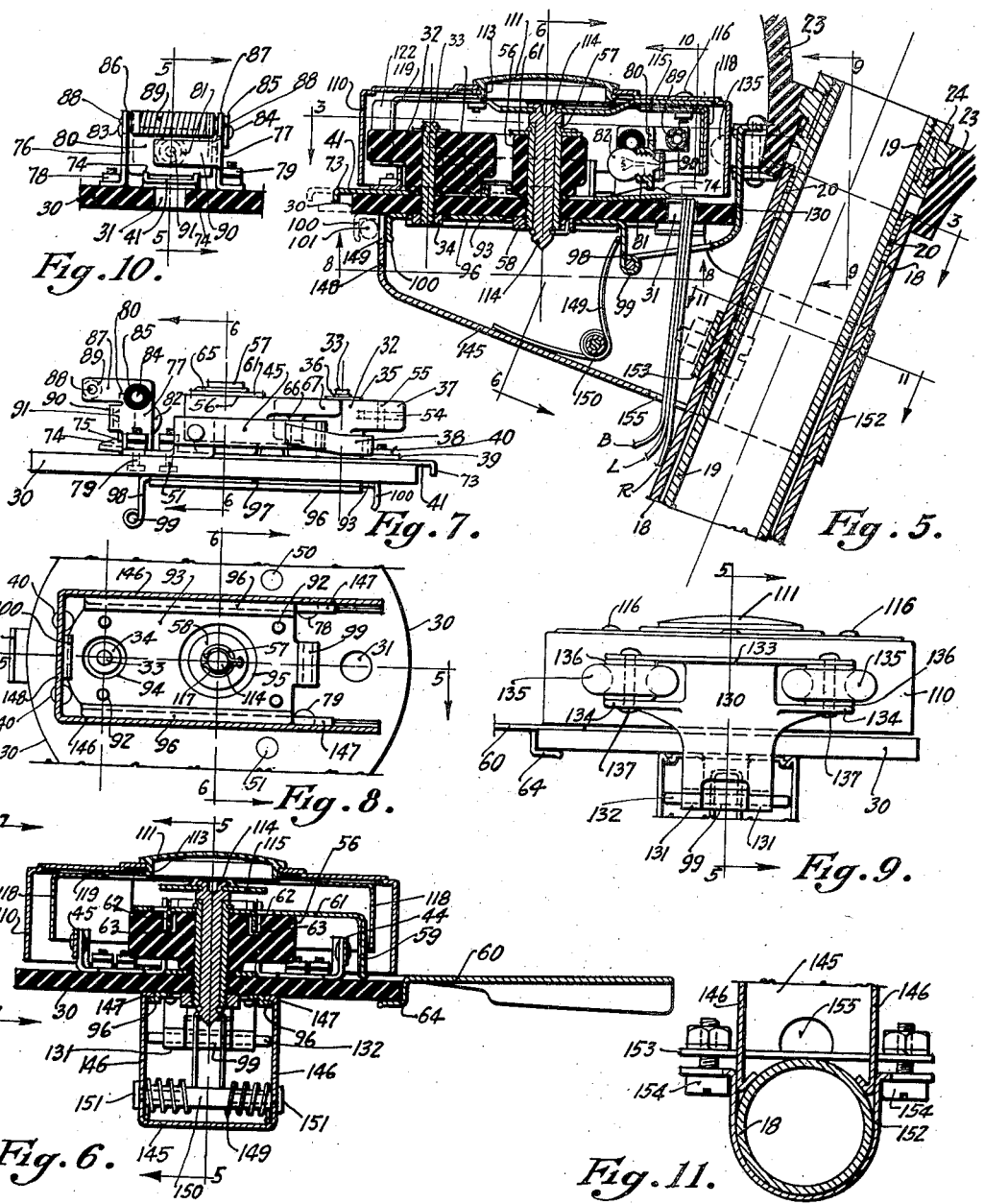
Inventor:
H B Tobias

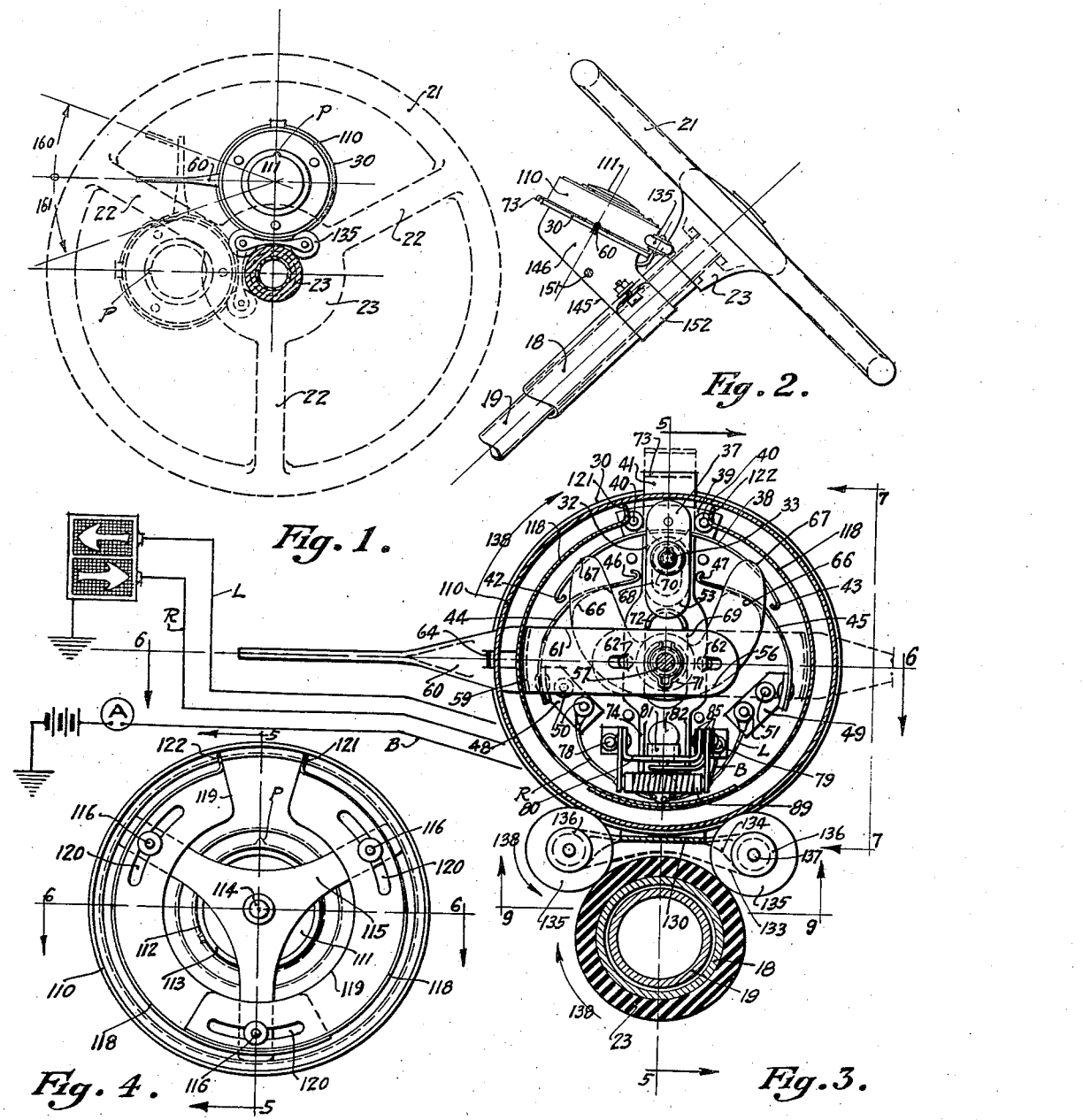

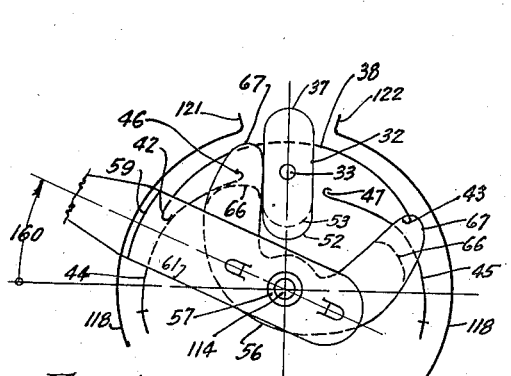
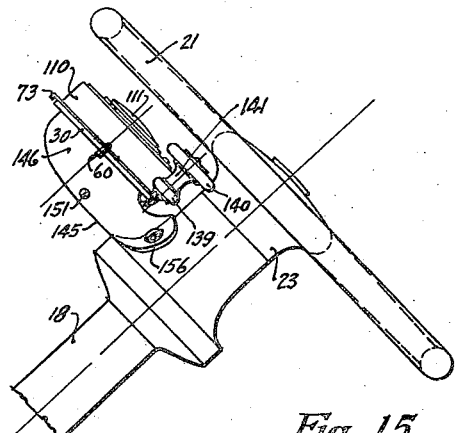
Fig. 12.
Fig. 15.
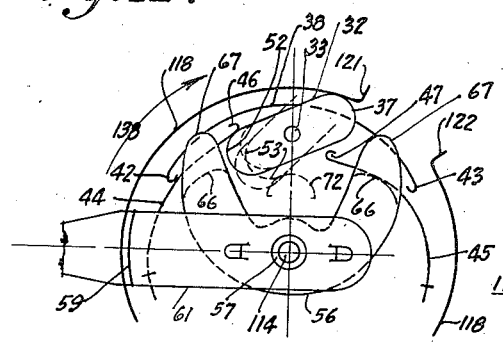
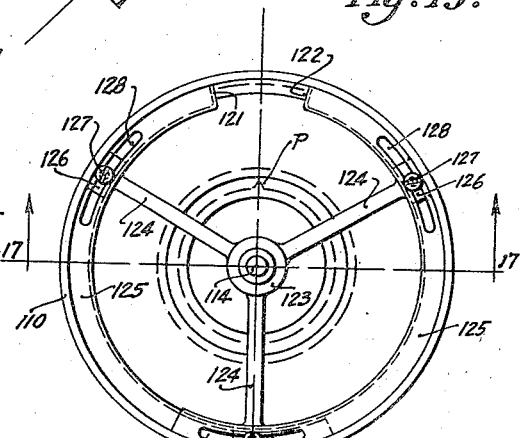
Fig. 13.
Fig. 16.
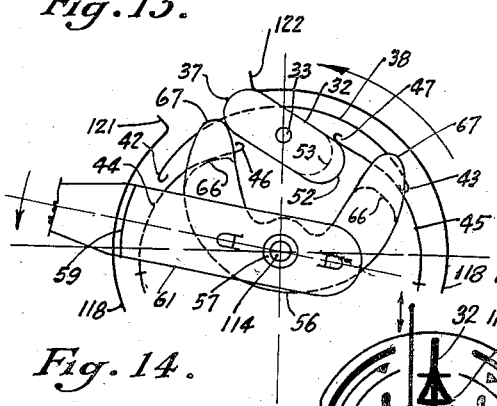
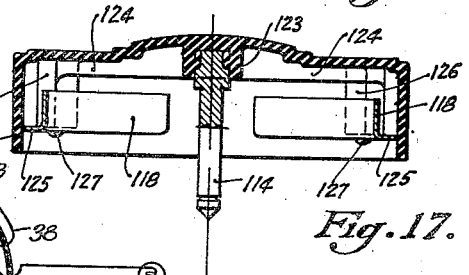
Fig. 14.
Fig. 17.
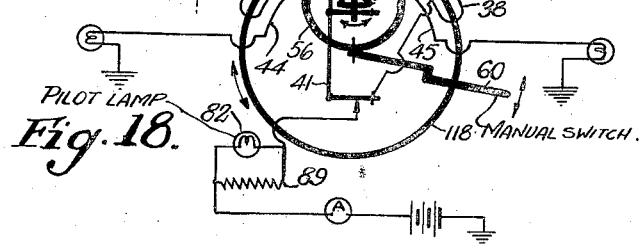
Fig. 18.
Inventor:
H. B. Tobias Patented Sept. 22, 1942

2,296,585

UNITED STATES PATENT OFFICE 2,296,585

DIRECTION SIGNALING DEVICE

Herrmann B. Tobias, Washington, D. C.

Application March 21, 1939, Serial No. 263,232

8 Claims. (Cl. 177—339)

This invention relates to direction signaling devices for vehicles and more particularly to a switching device suitable for indicating a contemplated change in the course of such vehicle to the left or to the right from a straight ahead direction.

One of the objects of the present invention is to provide a novel direction signaling system operated by mechanical means to control either manually or automatically the direction signaling lights of a vehicle.

Another object is to provide a novel switching mechanism so constructed as to be readily and inexpensively manufactured in large quantities and so simple in its mechanical parts that it can be readily installed, adjusted and serviced by the average vehicle operator.

A further object is to provide novel switch mounting means adapted to be secured to the steering post jacket of a vehicle, adjustable to the many various types of such steering post jackets and to engage the steering wheel or steering post of said vehicle in any position most convenient to the operator.

A further object is to provide within the switching mechanism automatic resetting of the switching parts upon the completion of a turn and a pilot light to indicate the proper or improper operation of the direction signaling lights.

The above and further objects and novel features of the invention will more fully appear from the following detailed description and the accompanying drawings on which is shown only one of the preferred forms of this invention and only a few of the variations, it being understood that the drawings are for purpose of illustration only and are not designed as a definition of the limits of the invention.

In the accompanying drawings like reference characters refer to like parts throughout the several views and where arrows appear the views are in the direction of said arrows.

Figure 1 is a small scale top view of the switching device mounted on the steering post jacket of a vehicle and below the steering wheel.

Figure 2 is a small scale side view of the switching device mounted on the steering post jacket of a standard type vehicle.

Figure 3 is a large scale plan view of the switching mechanism taken on line 3—3 of Figure 5 and showing diagrammatic extensions of the electrical connections to the direction signals and battery.

Figure 4 is an interior view of the rotating cover of the switching mechanism after removal therefrom.

Figure 5 is a sectional view of the switching mechanism taken on line 5—5 of Figure 3.

Figure 6 is a sectional view of the switching mechanism taken on line 6—6 of Figures 5 and 3.

Figure 7 is a side view of the switching mechanism, taken on line 7—7 of Figure 3, with the supporting bracket, rotating cover and idler assembly removed.

Figure 8 is a bottom view of the switching mechanism taken on line 8—8 of Figure 5, with the idler assembly removed.

Figure 9 is a side view of the switching mechanism taken on line 9—9 of Figure 5 and showing the idler assembly.

Figure 10 is a fragmentary sectional view taken on line 10 of Figure 5.

Figure 11 is a sectional view taken on line 11—11 of Figure 5.

Figures 12, 13 and 14 are diagrammatic line drawings of various parts of the switching mechanism in various functional positions.

Figure 15 is a small scale side view of the switching mechanism with a modified mounting bracket and idler assembly adapted to one of the special type steering post jackets of a vehicle.

Figure 16 is a reflected view of a modified form of the rotating cover shown in Figure 4, made of translucent plastic material.

Figure 17 is a sectional view taken on line 17—17 of Figure 16.

Figure 18 is a simplified wiring diagram of the signal system.

In the existing art, switches for directional signals have been mounted on the steering post jacket or on the steering post arranged to be controlled by a turn of the steering wheel of a vehicle.

Most of these switches did not give consideration to the fact that the steering wheel and steering post of most vehicles have a turn ratio of one and two-thirds to the full turning arc of the front road wheels of an automobile or like vehicles when making a short turn to either the right or left of a straight run, and therefore the result is false and confusing signals after the beginning of the second turn of the steering wheel, or the following reversion after such second turn.

It is one of the main purposes of this invention to so proportion the operating mechanism of this switching device that the one and two-thirds turn of the steering wheel and steering post will produce only about seven-eighths of a turn of the control mechanism of the switching device as will be more fully described herein.

The switching device consists primarily of a base plate 30 of insulating material such as fibre, plastic, Bakelite or rubber supporting various cams, electrical contact devices and pilot light assembly; a rotating cover 110 provided with an operating cam, translucent window and supporting shaft; a hollow bracket 145 slidably supporting the switching mechanism and provided with means for clamping to the steering post jacket; and an idler assembly bracket 130 for obtaining a frictional engagement between the hub of a steering wheel or steering post and the rotating cover of the switching mechanism.

The steering mechanism of most vehicles consist of a steering post jacket 18, rigidly fastened to the frame of the vehicle, within which is mounted the steering post 19 rotatably supported and aligned by the steering jacket bushing 20.

The steering wheel 21, spokes 22 and hub 23 is generally made of metal or reinforced Bakelite and the hub 23 is rigidly secured to the steering post 19 through a spline and lock device 24.

The movement of the steering wheel is transmitted through its hub and the idler assembly to the rotating cover of the device which activates the automatic features of the switching mechanism.

The switching device is preferably mounted under the steering wheel and in a position forward of the steering post jacket as shown by solid lines in Figures 1 and 2.

When a speedometer or similar instruments are mounted on the dash-board directly in front of the steering wheel, then, to avoid obscuring these instruments the switching device is mounted to one side of the steering post jacket as shown by the dotted lines in Figure 1.

Similarly the switching device may be mounted at any point around the steering post jacket most convenient to the operator and the manual operating lever may also be reversed to suit the hand of the operator.

The base plate 30 supports most of the switching mechanism, electrical contacts, and the electrical wires which are passed through hole 31 cut in the plate.

At the front end of plate 30 is mounted an I cam 32 of fibre, plastic, rubber or similar insulating materials, supported by a pivot pin 33 the lower end of which is undercut and threaded, passed through the base plate and secured thereto by the nut 34.

The I cam is retained on the pivot pin 33 by the washer 35 and a spring clip ring 36 that engages a ring groove cut into the upper free end of pin 33.

The front portion 37 of I cam 32 is undercut to clear the double winged electric contact spring 38 when the I cam is automatically swung to the right or to the left by the rotating cover 110 as will be hereinafter described.

The double winged spring 38 is secured at its center to the base plate 30 through an integral flange 39 and suitable spacing washers by the bolts 40.

These spacing washers are of such thickness that they permit a frictional contact between flange 39 and the pilot light switch plate 41 so that this spring 38 will receive current from the ungrounded side of battery through the electric wires designated B in a manner as hereinafter described. The opposite side of the battery is grounded as in ordinary practice.

The extreme ends of the double winged spring 38 are curled at 42 and 43 to insure a good contact with the spring 44 which carries current to the right signal light through electric wire designated R and with the spring 45 which carries current to the left signal light through electric wire designated L when the swing of the I cam 32 flexes either the spring 44 or 45.

The free ends 46 and 47 of springs 44 and 45 respectively are also curled and in the position shown in Figure 3 serve to hold the I cam 32 in a neutral position while a vehicle is following a straight ahead course.

Springs 44 and 45 are respectively riveted to angle clips 48 and 49 which in turn are secured to the base plate 30 by the bolts 50 and 51.

To one of the bolts 50 is secured the electric wire R to the right signal light and to one of the bolts 51 is secured the electric wire L to the left signal light.

In Figure 3 is shown a double faced signal which is suitable for mounting on the side of a vehicle and illustrates the circuit connections.

The specific construction of the signal light forms no part, per se, of the present invention, since any of the various types of signal lights, semaphores or other such signaling devices now manufactured may be used in combination with the switching device described herein.

The wires R and L are connected through suitable devices to the center plugs of the lamps, the lamp shells being in contact with the signal casing which in turn is suitably grounded to the frame of the vehicle as in usual practice.

The rear portion 52 of I cam 32 is arranged in two steps, the lower step 53 intended to engage a cam flange on the pilot light switch plate as will be herein described.

For use on heavy constant duty vehicles such as busses, trucks, etc., the front portion 37 of I cam 32 is provided with a roller plate 54 held in rotating position by pin 55 as shown by dotted lines only in Figures 3 and 7.

In the center of the base plate 30 is located a U cam 56 of fibre, plastic, rubber or similar insulating material intended for the manual operation of the switching mechanism.

The U cam 56 is supported at the center by a sleeve pivot 57 the lower end of which is undercut and threaded, passed through the base plate and secured thereto by the nut 58.

The U cam 56 is operated by the Z shaped lever 59, the lower portion 60 projecting a certain distance beyond the edge of the base plate 30 and the upper portion 61 having a punched hole to fit over the sleeve pivot 57 and come in contact with the upper surface of the U cam 56.

The swing of the lever 59 is transmitted to the U cam through the tongues 62 punched from the upper plate 61 and bent down to fit tightly into the holes 63 provided in the upper section of the U cam 56.

To steady the lower portion of the lever, a tongue 64 is punched from the lower plate 60 and is bent to fit around the edge of the base plate 30.

The U cam 56 and the upper plate 61 of the lever 59 is retained on the sleeve pivot 57 by a spring clip ring 65 that engages a ring groove cut into the upper free end of sleeve pivot 57.

The lever can be readily removed from its position on the left side of the device as shown in Figures 1 and 3 and placed on the right side as shown by dotted lines in the same figures.

The free ends of the U cam 56 are arranged in two steps, the lower steps 66 intended to flex spring 44 or 45 when the lever is operated to indicate direction of turn and the upper steps 67 designed to clear the springs 44 and 45 and intended to contact the sides of the I cam 32 and serve to return the U cam to neutral position when an error is made in setting the lever 59 or when the turn is made in a direction opposite to that originally intended and signalled by the setting of the lever 59.

The pilot light switch plate 41 is slidably mounted between the base plate 30 and the I and U cams and has punched openings 68 and 69 to pass over the pivots 33 and 57 respectively.

Fiber insulating washers 70 and 71 of the same thickness as plate 41 are placed respectively around pivots 33 and 57 and their outer edge contacting the sides of punched openings 68 and 69 serve to align the sliding switch plate 41.

The punched opening 68 is of such length as to act as a limit stop for the forward and backward movement of sliding plate 41.

Out of the metal punched to form opening 69 there is also formed a curved cam flange 72 to be engaged by the lower step 53 of the rear portion 52 of I cam 32 so as to return sliding switch plate 41 to contact position with pilot light support shown in Figures 3 and 5.

Sliding plate 41 is flanged at the forward end to form the grip 73 for operating the switch plate, and at the rear end to form beveled contact flanges 74 and retaining notches 75 designed to engage the lower edge of the plate 80 supporting the pilot light.

At the rear of base plate 30 are provided pedestals 76 and 77 secured through integral flanges to said base plate with bolts 78 and 79 respectively.

Between the said pedestals is located a pilot light supporting plate 80 provided with an annular flange 81 which is threaded or slotted to receive and firmly hold the base of pilot lamp 82.

The pilot light plate is flanged at both sides, one flange being secured directly and in electric contact to the pedestal 76 by the rivet 83, and the other flange being secured to the pedestal 77 by the rivet 84 but prevented from forming electric contact by the insulating fibre washers 85.

Both pedestals 76 and 77 are extended at the top to form arms 86 and 87 respectively, with indentation 88 at the end of each to receive and hold the pointed ends of a standard cartridge resistor 89.

Below the arm 87 of pedestal 77 an integral spring flange 90 contacts the plug end 91 of the pilot light 82.

To the bolt 79 of pedestal 77 is attached by a suitable terminal the battery wire B.

The current from the undergrounded side of the battery reaches the double winged spring 38 through wire B fastened to bolt 79, through pedestal 77, arm 87, resistor 89, arm 86, pedestal 76, pilot light plate 80, sliding switch plate 41 and flange 39.

The pilot light 82 being in shunt with the resistor 89 receives a small amount of current to light it, through pedestal 77, spring clip 90, plug end 91 of pilot light, light filament, base of lamp to annular flange 81, pilot light plate 80 and sliding switch plate 41.

The resistance unit is inserted in the circuit to the direction signal light to give a drop in voltage across the resistor sufficient to light the pilot light when the circuit to one of the signal lights is closed by the spring 38 contacting either spring 44 or 45.

The cartridge type of resistor is preferred since it permits easy replacement with higher or lower resistances depending on the number and individual candle power of the signal lights that may be attached to the terminal bolts 50 or 51.

The underside of base plate 30 is counterbored for the heads of bolts 40, 50, 51, 78 and 79 so as to set them back of the face of base plate and avoid electrical contact between them and other adjacent metal parts.

The base plate 30 can be produced from an opaque moulded plastic material having the bolts 40, 50, 51, 78 and 79, the pivots 33 and 57 and the flanges 98 and 100 anchored into the plastic material during moulding and having the grooves 97 formed of said plastic material.

To the underside of base plate 30 is secured by the rivets 92 a plate 93 having holes 94 and 95 punched therein sufficiently large to clear nuts 34 and 58 respectively.

The sides of the plate 93 are offset at 96 to form in connection with the base plate 30 grooves 97 which slidably engage flanges 147 in the bracket 145 hereinafter described.

At one end of plate 93 is a flange 98 terminating in a sleeve 99 to form a leaf in the hinge supporting the idler assembly bracket hereinafter described.

At the other end of plate 93 is a smaller flame 100 intended to hold the switching mechanism out of engagement with the steering wheel when pulled away from the steering post jacket as shown by dotted lines in Figure 5 and a pencil or similar object 101 is inserted between the flange and the end of the bracket.

The rotating cover 110 of cylindrical form is mounted over the base plate 30 and covers all the switching mechanism mounted on said base plate.

The indentations in the top of the cover are designed only to improve the appearance of the top.

In the center of the top is placed a window 111 moulded from colored translucent plastic material held in place by a spring ring clip 112 engaging a groove in the flange 113 of the moulded window.

A pivot pin 114 which fits the sleeve 57 of the base plate 30 is shouldered at the top to bear upon the top of the sleeve 57 and is riveted to a supporting plate 115 which in turn is secured to the top of the cover 110 with the bolts 116 and supports said cover in its rotating position.

The bottom of the pin 114 is pointed to facilitate insertion into sleeve 57 and is retained in position by the ring spring clip 117 fastened to nut 58 engaging a ring groove in the said pivot pin.

Within the rotating cover 110 is a circular rotating cam 118 formed of two segmental parts neatly telescoped at the center of its periphery to form practically a continuous operating unit and adjustably secured to the cover through integral flanges 119 by the bolts 116 passing through segmental slots 120.

The free ends of the two segments of the rotating cam 118 are flanged at 121 and 122 and the space setting between these two flanges delineates the neutral zone of the switching mechanism when a vehicle moves in a straight line and the I cam is in its neutral position shown in Figures 3 and 12.

The space setting for this neutral zone is generally equivalent to 1/20 to 1/24 part of the circumference of the circle of the rotating cam, which at the ratio of 1 2/3 turn of the steering wheel to 7/8 turn of the switching mechanism, represents a neutral zone at the steering wheel of from 1/10 to 1/12 part of the circumference of its circle.

The movement of the steering wheel within the above zone is necessary to steer the car in a straight line and a turn of the wheel beyond this zone will automatically operate the turn signals.

If the operator desires to delay action of the signal light he can readily do so by increasing the space setting of either one or both of the flanges 121 and 122.

The rotation of the cover 110, which carries with it the rotating cam 118, to the right or to the left will move flanges 121 or 122 into contact with the front end 37 of I cam 32 and swing it to the corresponding position that will close the circuits between contacts spring 38 and either spring 44 or 45 according to its direction.

When the circuit is completed the pilot light 82 will illuminate the interior of the switching device and make the translucent window 111 glow to indicate to the operator that the signal light is set and that it is in working condition.

While I have shown in Figures 3, 4, 5 and 6 a rotating cover made of metal with a translucent window, it is not my desire to be limited to that type of construction since a rotating cover can be produced from a translucent moulded plastic material as shown in Figures 16 and 17.

In a moulded plastic cover the metal pin 114 is cast into the plastic hub 123 from which radiate the integral ribs 124.

The rotating cam shown with the metal cover is modified by providing the flanges 125 at the lower end to permit them to be secured to the integral posts 126 by the screws 127 passed through the segmental slots 128.

The idler assembly bracket 130 is forked at the lower end, each blade terminating in a sleeve 131 designed to fit on each side of sleeve 99 of plate 93 and with the loose pin 132 to form a hinge for the flexible mounting of bracket 130.

At the upper end of bracket 130 flanges 133 and 134 are cut and bent to form supports for the two idlers 135 of rubber or similar yielding material, mounted on the spools 136 and held in place by the rivets 137.

The position of the two idlers 135 is such that they engage the side of the rotating cover 110 and the hub 23 of the steering wheel to line them up and to transfer the rotating direction of the hub 23 to the rotating cover 110 as shown by the arrows 138 in Figure 3 for a right turn.

The size of the idlers 135 is not important on vehicles with a small hub on the steering wheel.

When the switching device is to be installed on a vehicle with a large steering wheel hub, it is necessary to use a reduction idler as shown in Figure 15.

This reduction idler must have a predetermined ratio between the small idlers 139 and the large idlers 140 both mounted on a special spool 141 designed to transfer the rotation of the steering wheel hub engaging the large idlers 140 through the smaller idlers 139 engaging the rotating cover 110 and turning it at a reduced ratio.

A reduction idler may also be used in connection with a standard size steering wheel hub similar to that shown in Figure 2 when it is desired to reduce the size of the switching device to render it less conspicuous or when the available space for its installation is limited.

The hollow bracket 145 is subject to more variations than any other part since it is the means for securing the switching device to the many and different types and sizes of steering post jackets and steering wheels.

The hollow bracket is provided with sides 146 which have flanges 147 at the upper side to slidably engage the groove 97 formed by the plate 93 and base plate 30.

At the end 148 of the bracket there is a cut-out section 149 of such size as to permit the passage of the hinge flange 99 and the point of the pin 114 of rotating cover 110.

The slidable mounting of the switching device is intended to bring the rotating cover 110 through the idlers 135 in frictional contact with the lower part of the steering wheel hub 23 under extensible pressure of the helical twist spring 149 against flange 99.

The helical twist spring 149 is held in position by the threaded sleeve 150 passing through the side walls 146 and secured by screws 151.

The bracket 145 is secured to the steering post jacket by a suitable clamp such as shown in Figure 11, formed by a flanged strap 152, the bar 153 passed through punchings in the walls 146 of the bracket and bolts 154.

A hole 155 is punched in the bottom of the bracket 145 near the steering post jacket 18 to allow the passage of the electrical wires.

One of the variations of the hollow bracket construction is shown in Figure 15, consisting of a special flanged detail for fastening it to the steering post jacket housing with tap screws 156.

The operation of the switching mechanism can be more readily understood from the line diagram in Figures 12, 13 and 14 and the drawing in Figure 3.

When the operator of a vehicle equipped with this invention is traveling in a straight direction all of the switching parts will be in the neutral positions shown in Figure 3.

Should the operator swerve too much to one side or the other of a straight direction beyond the neutral zone space setting of rotating cam 118, the automatic switch will operate to light alternately the right and the left direction signals and thus placing a following operator on guard.

When the operator wishes to turn to the right at the next intersection he will, as he approaches said intersection, signify his intention by moving lever 59 in the direction of the turn or to the right or clockwise as shown at 160 in Figure 12, depending on the position of the switching device when mounted on the steering post jacket.

This manual movement of lever 59, turns the U cam 56 until the end 67 touches the side of the I cam 32. The lower step 66 of U cam 56 flexes the contact spring 44 causing it to contact spring 38 and thereby completing the circuit that will light the lamp of the right direction signal.

Should the operator forget to indicate his intention to turn right as he approaches the street intersection, then, the automatic switching will operate through the rotating cam 118 actuated by the steering wheel and idlers 135.

The rotating cam 118 as it turns to the right will engage the front end 37 of I cam 32 and swing it around as shown in Figure 13 causing the rear end 52 of the I cam 32 to flex the contact spring 44 to bring it in contact with spring 38 and thus complete the electric circuit for the right direction signal light.

When the manual signal is set as in Figure 12 and the automatic signal is started as in Figure 13, then, the rear end 52 of I cam 32 as it is turned will press against the side of the lower step 66 of U cam 56 forcing the U cam 56 and lever 59 back into neutral position and at the same time the front part 37 of I cam by its proximity to the curled end 47 of contact spring 45 will prevent the flexing of spring 45 and the closing of the left signal light circuit while the right signal light is in circuit.

Should the operator indicate his intention to turn right by moving the lever 59 to the position shown in Figure 12 and when he approaches the intersection he finds he must turn to the left and has no time to change the position of the lever 59, then, the automatic switching will operate through the rotating cam 118. As this cam 118 turns to the left it will engage the front end 37 of I cam 32 and swing it around as shown in Figure 14 causing this end to press against the high step 67 of the U cam 56 to start it back into neutral position and to press against curled end 46 of contact spring 44 to break the contact with spring 38 and to further exert pressure against the lower step 66 of U cam 56 to complete its return to neutral position, while the rear end 52 of I cam 32 pressing against curved end 47 of contact spring 45 flexes it into contact with spring 38 and completes the electrical circuit to the left direction signal light.

The operations of the switching device for a left turn indication are the same but in the opposite direction. The manual operation of the lever 59 would be to move it in the direction of the turn or to the left or counterclockwise, as shown at 161 in Figure 1, depending on the position of the switching device on the steering post jacket.

It will be noted that the switching mechanism always operates automatically signaling the right or left turn in accordance with the right or left turn of the steering wheel or post. When preset by hand, the manual operation is released by the automatic mechanism. When a wrong signal is given or a change of intention takes place or a change of direction is necessitated by an emergency, the automatic mechanism will rectify the signal given.

The switching device being of very simple design and mechanical in its action, is dependable, trouble free, easy to understand and to repair or adjust when necessary.

When it becomes necessary to change the space setting for the neutral zone it is easily done by pulling the base plate 30 against the extension force of spring 149 and away from the steering wheel hub 23 until the flange 100 is outside the end 148 of the bracket 145 as shown by dotted lines in Figure 5 and inserting a pencil, rod or similar article 101 between said flange 100 and end 148 to hold it in this position. This releases the tension against the idlers 135 and steering wheel hub 23, then the rotating cover 110 can be temporarily removed, the bolts 116 released, the rotating cam 118 adjusted as necessary, the cover replaced, the pencil 101 removed and the base plate 30 permitted to return to its engaged position.

When the rotating cover is accidently turned out of adjustment it can be returned to perfect registry by hand turning the rotating cover 110 until the point P of the translucent window 111 is in the position shown in Figure 1.

When the vehicle is parked with the front wheels turned toward the curb, the corresponding direction signal will be switched and to disconnect it, the operator pulls outward the grip 73 of pilot switch plate 41 which disconnects the beveled contact flanges 74 from the pilot lamp supporting plate 80 and extinguishes the corresponding direction signal. When plate 41 is pulled outward the integral cam flange 72 moves from the position shown in Figure 3 to that shown in Figure 13. When the front wheels are turned straight the I cam 32 is returned to neutral position and the lower step 53 of rear end 52 pressing against cam flange 72 pushes plate 41 back into contact position.

Referring particularly to Figures 13 and 14, it will be obvious that when the cam 32 is turned by movement of the steering wheel from the straightaway or neutral position to make a left turn or a right turn, it is disposed lying between the tips of the U-shaped member 56, and in the path of movement of the tips, so that the member 56 is locked against movement to a signaling position by manipulation of the lever 59. The member 56 is automatically thrown to neutral position, and the lever 59 cannot be moved inadvertently by hand to a false turn-indicating position while the driver is turning the car.

Although, I have shown certain preferred embodiments of my invention, and certain variations and modifications of parts, and materials and positions possible or necessary to adapt this invention to various conditions of use, I desire it to be understood that I do not wish to be limited thereby as other changes and variations may be made therein without departing from the essence of the invention or the spirit and scope of the appended claims.

Having thus described my invention, what I claim and desire to secure by Letters Patent is:

1. In turn indicating means for a vehicle, which vehicle is provided with a source of current, with a steering wheel, and with current-responsive signal means indicative of a left turn or a right turn, respectively, a turn indicating control switch, said control switch including a manually operable lever turnable to right turn, left turn, and non-signaling neutral positions, respectively, means connected movable in response to the turning of the steering wheel for a left turn or a right turn, respectively, to automatically move said lever to neutral position from a manually set turn position while maintaining said switch in a closed position corresponding to the turning movement of said wheel, and means to lock said lever in non-signaling position against manual movement while said steering wheel is in control of the turn indicating signal.

2. In turn indicating means for a vehicle, which vehicle is provided with a source of current, with a steering wheel, and with current-responsive signal means indicative of a left turn or a right turn, respectively, a turn indicating control switch, said control switch including manually operable means movable to selectively connect said signal means in a circuit with said source to indicate a right turn or a left turn, respectively, and wheel-controlled means operable in response to movement of said steering wheel for a turn to automatically restore said manually operable means to non-signaling position from a manually set turn indicating position while closing said switch to connect said source in circuit with a signal means indicative of the turn of the wheel, and means operable in response to movement of said wheel for a turn to automatically lock said manually operable means against manual operation while the wheel-controlled means are in control of the signal circuit.

3. In turn indicating means for a vehicle, which vehicle is provided with a source of current, with a steering wheel, and with current-responsive signal means indicative of a left turn or a right turn, respectively, a turn indicating control means comprising a plurality of switches normally in open position and selectively closable to indicate a left turn or a right turn, respectively, manually operable means normally in neutral and non-signaling position and movable to turn-indicating position to selectively close only one of said plurality of switches at a time, means connected movable in response to the turning of said steering wheel for a turn to automatically move said manually operable means to neutral position from a manually set turn-indicating position, and to coincidentally move a selected one of said plurality of switches to connect a signal means to said source indicative of the turn of said wheel, and means to lock said manually operable means in non-signaling position against manual movement while said wheel is being turned to turn the vehicle.

4. In turn-indicating means for a vehicle, which vehicle is provided with a steering wheel, with a source of current, and with current-responsive signal means, a turn-indicating control means comprising a first switch means connectible with said wheel for movement therewith to left turn, to right turn, and to neutral, positions, respectively, to correspond to left turn, to right turn, and to straightaway, positions of said wheel, respectively, said first switch means including a lever manually movable to left, to right turn, and to neutral, positions, respectively, said switch means including means to automatically move said lever from a turn position to neutral position and to lock said lever in neutral position while said wheel is in a turn position, a second and manually operable switch connected in series circuit association with said first switch means and movable to open and to closed positions, respectively, means connecting said first switch means with said second switch means to lock said second switch means in closed position only when said first switch means are in neutral position, and to automatically move said second switch means from a manually set open position to the closed position upon subsequent movement of said first switch means.

5. In turn-indicating means for a vehicle, which vehicle is provided with a source of current, with a steering wheel, and with current-responsive signal means, a turn-indicating control means comprising a first switch means connectible with said wheel for movement therewith to left turn, to right turn, and to neutral positions, respectively, to correspond to left turn; to right turn, and to straightaway positions of said wheel, respectively, a second and manually operable switch means connected in series circuit association with said first switch means and movable to closed and to open positions, respectively, means connecting said first switch means with said second switch means to lock said second switch means in closed position only when said first switch means are in neutral position, and to automatically move said second switch means from a manually set open position to the closed position upon subsequent movement of said first switch means.

6. In turn-indicating means for a vehicle, which vehicle is provided with a steering wheel, with a current source, and with current-responsive signal means, turn-indicating control means comprising a switch means including a manually operable lever movable to left turn, to right turn, and to neutral position, respectively, said switch means including a member for connection with said wheel for movement therewith to left turn, to right turn, and to neutral position, respectively, to correspond to left turn, to right turn, and to straightaway position of said wheel, respectively, and means movable in response to movement of said member to a turn position to automatically move said lever from a manually set turn position to its neutral position and to lock said lever against manual movement from its neutral position while said member is in a turn position.

7. In turn-indicating means for a vehicle, which vehicle is provided with a steering wheel, with a current source, and with current-responsive signal means, turn-indicating control means comprising a first switch means including a manually operable lever movable to left turn, to right turn, and to neutral position, respectively, said first switch means including a member for connection with said wheel for movement therewith to left turn, to right turn, and to neutral position, respectively, to correspond to left turn, to right turn, and to straightaway position of said wheel, respectively, a second and manually operable switch connected in series circuit association with said first switch and movable to open and to closed positions, respectively, and locking means connected movable with said member to lock said lever against manual movement when said member is in a turn position, and to lock said second switch means against manual movement from a closed to an open position when said member is in neutral position.

8. In turn-indicating means for a vehicle, which vehicle is provided with a steering wheel, with a current source, and with current-responsive signal means, turn-indicating control means comprising a normally open first switch, a normally open second switch, a manually operable lever movable to a left turn, to a right turn, and to a neutral position, respectively, and operable to effect closing of said first switch when in left turn position, and to effect closing of said second switch when in right turn position, a member inclosing said switches, said member being arranged for connection with said wheel for movement therewith to left turn, to right turn, and to neutral position, respectively, to correspond to left turn, to right turn, and to straightaway position of said wheel, respectively, means movable by said member to automatically move said lever from a manually set turn position to its neutral position and to lock said lever in neutral position against manual movement when said member is in a turn position, and to then close a selected one of said switches corresponding to the turn of the member.

H. B. TOBIAS.